United States Patent

Åhlén et al.

[11] Patent Number: 6,160,479
[45] Date of Patent: Dec. 12, 2000

[54] METHOD FOR THE DETERMINATION OF THE DISTANCE AND THE ANGULAR POSITION OF AN OBJECT

[75] Inventors: Hans Åhlén, Stockholm; Olof Carlsson, Lund, both of Sweden

[73] Assignee: Besam AB, Landskrona, Sweden

[21] Appl. No.: 09/180,349

[22] PCT Filed: Apr. 29, 1997

[86] PCT No.: PCT/SE97/00722

§ 371 Date: Feb. 19, 1999

§ 102(e) Date: Feb. 19, 1999

[87] PCT Pub. No.: WO97/42465

PCT Pub. Date: Nov. 13, 1997

[30] Foreign Application Priority Data

May 7, 1996 [SE] Sweden .................................. 9601742

[51] Int. Cl.[7] .................................................. G08B 13/18
[52] U.S. Cl. .......................... 340/555; 340/556; 340/557
[58] Field of Search ............................ 340/545.1, 545.3, 340/555, 556, 557, 686.1, 686.2, 686.6

[56] References Cited

U.S. PATENT DOCUMENTS

| 4,319,332 | 3/1982 | Mehnert .................................. 340/556 |
|---|---|---|
| 4,628,496 | 12/1986 | Lee ......................................... 340/540 |
| 4,760,381 | 7/1988 | Haag ....................................... 340/556 |
| 4,879,461 | 11/1989 | Philipp ................................... 340/555 |
| 4,967,083 | 10/1990 | Kornbrekke et al. ................... 340/545 |
| 5,357,309 | 10/1994 | Seki ........................................ 396/109 |
| 5,739,523 | 4/1998 | Tsutsumi et al. ....................... 340/555 |
| 5,973,594 | 10/1999 | Baldwin et al. ........................ 340/541 |

FOREIGN PATENT DOCUMENTS

| 40 31 453 A1 | 4/1992 | Germany . |
|---|---|---|
| 2 291 552 | 1/1996 | United Kingdom . |

*Primary Examiner*—Van Trieu
*Attorney, Agent, or Firm*—Ware, Fressola, Van der Sluys & Adolphson LLP

[57] ABSTRACT

A method of determining distances and angular positions of stationary and moving objects (3), for example in an area to be monitored in connection with for instance swing doors. The determination is done by means of triangulation where light, which in the main part is collimated, is transmitted (1) into the area at different angles and in a certain sequence. The reflected light is correspondingly registered on a position-sensitive sensor (5) which is positioned at a certain distance from the transmitter (1). The position (5a, 5b), where the reflected light falls on the sensor (5), represents the distance, and the moment when the light is received represents the angular position of the detected object. The values are compared to stored reference values which change when the angle of the door's opening is changed.

13 Claims, 3 Drawing Sheets

METHOD FOR THE DETERMINATION OF THE DISTANCE AND THE ANGULAR POSITION OF AN OBJECT

BACKGROUND OF THE INVENTION

1. Technical Field

This invention relates to a method and device for determining the distance and position of stationary and moving objects, for example within an area to be monitored in connection with, for instance swing doors.

2. Description of the Prior Art

It is known to use sensors for detecting objects, such as people, in close vicinity to, for example swing doors which open automatically. One common sensor is a pressure-sensitive mat placed in front of the door where the form and size on the mat is adapted to current rules and criteria. The disadvantage with such mats is that they quickly become worn out, they are expensive since they must often be recessed on the ground level and that they are sensitive to sharp objects such as heels and stones. Another known sensor is based on the capacitive function but the disadvantage with this sensor is that it is sensitive to disturbances from the temperature, dampness and so on. In addition, it is difficult with this sensor to distinguish between stationary objects that are close to each other. For moving objects, it is known to use sensors based on microwave and the Doppler effect technology. Using passive infra-red technology is also known but the disadvantage of this is the difficulty in detecting objects which have the same temperature as their surroundings. Finally, it is also known to use active infra-red technology in sensors but these known devices often have the disadvantage of the object's size and properties of reflection greatly affecting the distance of detection and sensitivity. For sensors of the above types, it is necessary that they fulfill certain stipulated requirements, for example the requirements on the size and form of the security area, the capacity to be able to distinguish between several objects in the area, response time, noise tolerance and so on.

The method according to this invention provides a solution to the above given problems.

SUMMARY OF THE INVENTION

The objective of the invention is to provide a method for determining the degree of the angular position and distance to stationary and moving objects which are found to be within the area to be monitored in connection with, for example swing doors or the like. The determination takes place with triangulation, that is the optical measurement of distance with help of the measurement of the angle in a triangle with a known base. The purpose of this measurement is to detect whether any object appears within the door's so called "security area" and, in such case to send a signal to the door's driving device to not close/open the door or to change the door's movement. Another purpose is to initiate the opening of the door if someone approaches the activation area of the doors.

Amongst other things, the invention is characterized by light, which is mainly collimated, being transmitted to the area to be monitored in a certain sequence and at different angles. The reflected light is then registered in a position-sensitive detector located at a certain distance from the transmitter. As soon as the distance to the object changes, the point of registration on the detector changes. Consequently such a sensor's primary output becomes the distance to an object and in which angular section the object appears.

DESCRIPTION OF EMBODIMENTS

Figure 1:
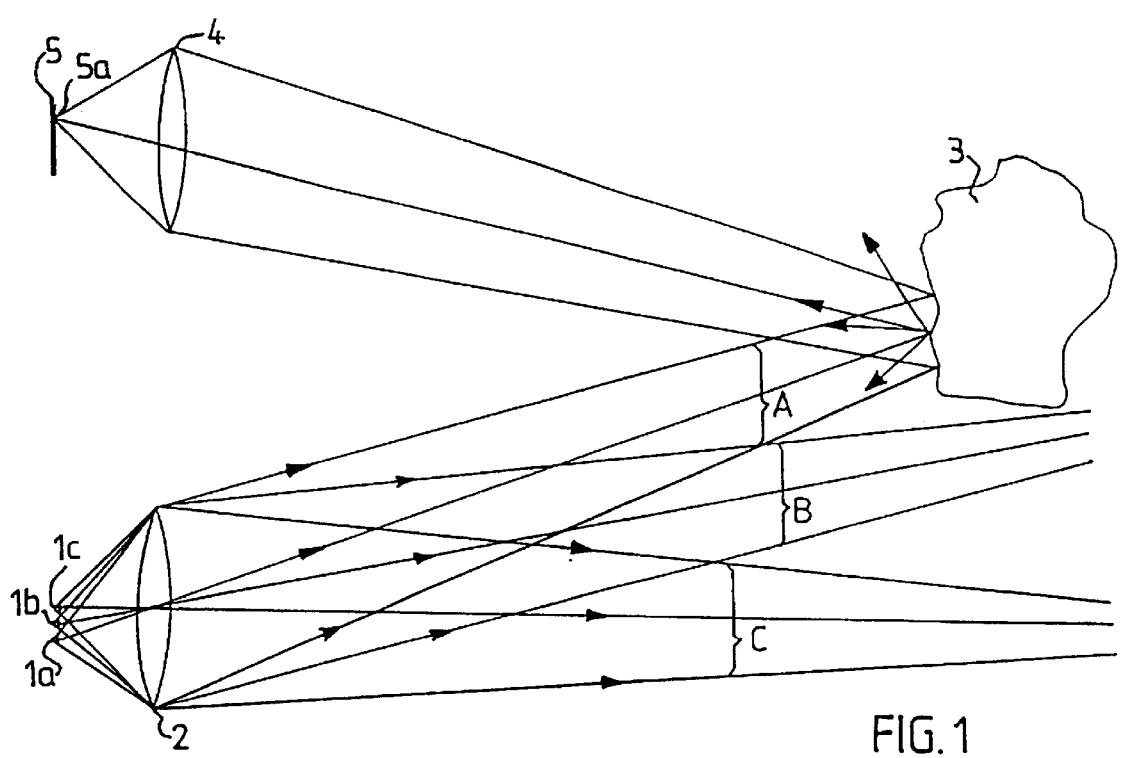
FIG. 1 is a diagrammatic view showing the optical path of light transmission to a sensor according to the invention.

FIG. 1 shows the path of light transmission to a sensor used to determine distance and position according to the invention, and where 1 (FIG. 2) represents one or more sources of light (1a, 1b, 1c), for example IR light sources in a transmitter. These light sources are arranged in a special pattern and by such the transmitted light can be collimated by means of a transmitter optic system, 2, and sent out at different, fixed angles in a pre-determined sequence. If the IR light from one of the sources, 1a, falls on an object, 3, it is reflected and captured by a receiver optic system, 4, and focused on a position-sensitive sensor. FIG. 1 shows how the IR light transmission, A, falls on object 3 and is reflected to the receiver optic system 4 which focuses the light beam on point 5a on the position-sensitive sensor 5. According to FIG. 1, the light is transmitted at three different levels, namely one which is horizontal to ground level (C) and two which are directed upwards and at different angles (A and B). The light at every level is directed in different directions (not shown) so that at every level the area, which should be monitored, is illuminated with light sources arranged in the shape of a fan. Naturally other ways of dividing a security area into angular sections are conceivable.

Figure 2:
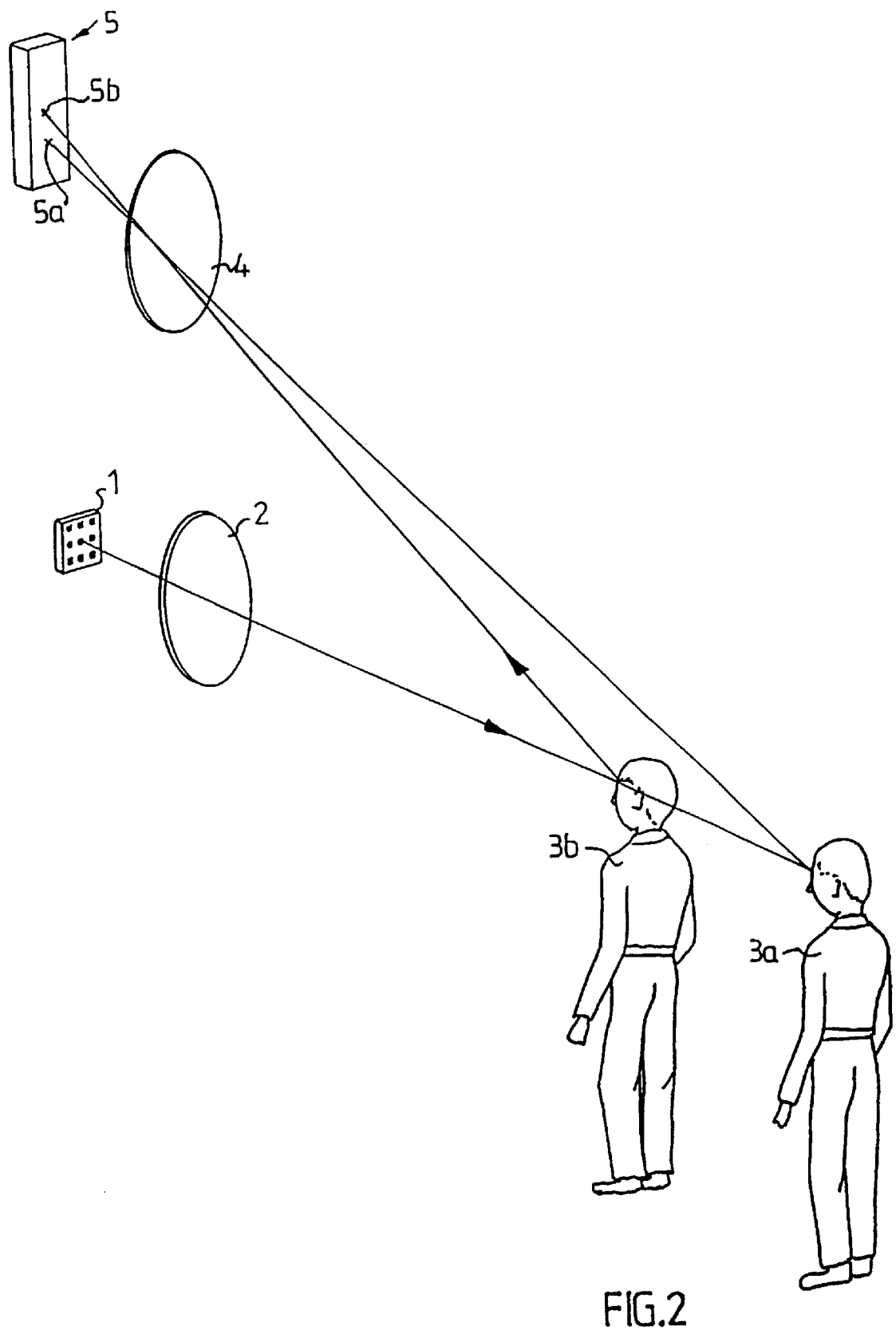
FIG. 2 is a perspective view of an embodiment of the path of light transmission according to the invention.

FIG. 2 shows what happens when an object approaches sensor 5. Object, 3a, appears at a certain distance from sensor 5 and the reflected light from one of the transmitters' light sources, 1, provides a point of registration, 5a, on sensor 5. When the object, 3b, approaches the sensor, the registration in sensor is changed to 5b. Thus, when the distance to an object is changed, the registration position in the position-sensitive sensor 5 is shifted on the surface of the detector and in such a way that output signals, which are varying according to the distances, are obtained. The distance of the object is calculated with the help of triangulation in a way known in the art with the base equal to the distance between the transmitter and receiver.

The range of measurement is divided into several angular sectors. It has become apparent that it is advantageous to direct light sources, e.g., light-emitting diodes, horizontally or diagonally upwards, i. e. not directed to the ground, and to direct the detectors diagonally downwards or horizontally, i. e. not towards the sun or the ceiling.

Figure 3:
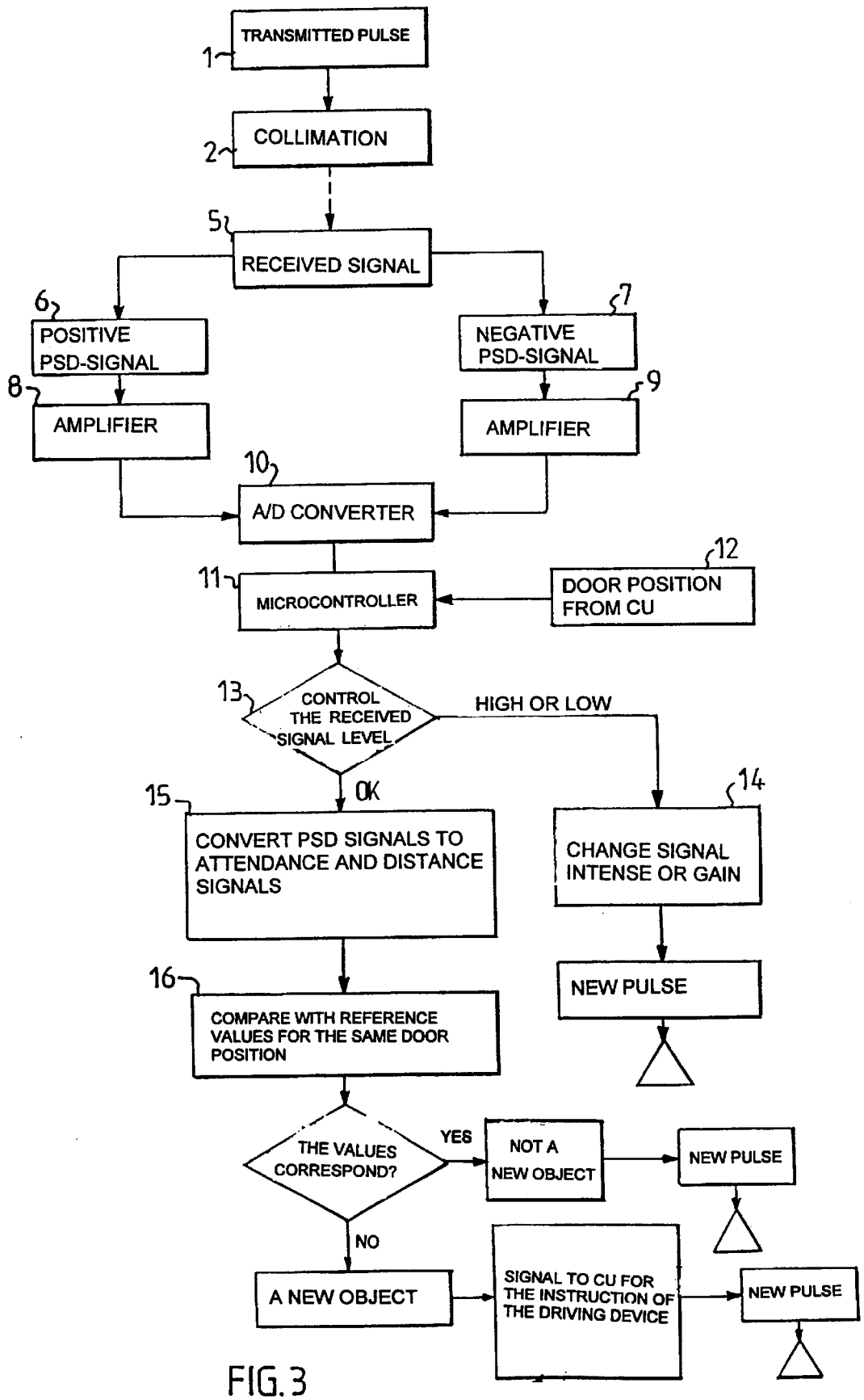
FIG. 3 is a flow chart of the detection process according to the invention.

In FIG. 3, 1 represents the transmitted light pulse, that is collimated in transmitter optic system 2 and transmitted at a verified time and at a certain angle to the area being monitored. The reflected, received signal falls on a position sensor 5 whose positive detection signal 6 and negative detection signal 7 are amplified 8, 9 and carried further to an analog-to-digital converter 10. The output signal is sent to a microcontroller or another digital electronic device, 11, which also receives a door-position signal, 12, from a control unit (CU). Microcontroller 11 detects the level of the position-detection signals, 13, and if these are too high or too low, the intensity 14 or the amplification of the transmitted signals changes. If the intensity is normal, the position-detection signals are converted to presence or distance signals, 15, which are compared, 16, with stored reference values of current position of the door. If the reference values correspond, there is no new object in the area of angular detection. However if the values do not correspond, there is a new object in the area of angular detection—in which case and in accordance with pre-programmed instructions, a signal is sent to the driving device to not open/close the door or to change the door's movement.

The sequence in which the light-emitting diodes are lit is controlled from the microcontroller. If the object, according to the signals, is found within an activation area or in the security area, this is communicated to the control unit to open/close the door or change its movement in terms of a change in direction or speed. The signal is treated with respect to background light, noise and so on—as such treatment is known in itself, it is not described more closely here. The intention is to produce a measuring signal without background and with as little noise as possible. To further suppress disturbing light, the receiver can be equipped with a band-pass filter which lets through the desired IR light and suppresses other undesired light. Disturbance from similar sensors, for example from a facing door, is suppressed by synchronous detection and by having different modulation frequencies for different sensors.

In order to be able to detect objects in the area in front of the door, the entire area must be scanned. According to one embodiment of the invention, the area is scanned by sequentially transmitting collimated light from light-emitting diodes within the IR range. The light is transmitted at various angular directions both vertically and horizontally. If any object is identified within the sensor's area of scanning, the position of the object is determined by combining the known direction of the angle of the transmitted light and the registered distance from the triangulation measurement.

The security area is often defined as the rectangular area in front of the door. Therefore, the sensor will detect undesired objects that appear in this rectangular area. In close proximity to the security area, there can be stationary objects which should not disturb the monitoring function. To avoid this, the position of these stationary objects is input and stored and then compared with the detected values.

The sensor is often fitted to a moving door. Because of the previously stated reasons, it must be possible to change the sensor's sensitivity concurrently with the angle of the door's opening. This is achieved by:

sequential measurement of distance at different angular directions which produce a distance survey of the surroundings near the door.

input and storage of data on the door's surroundings at different angles of the door's opening.

comparison of the data currently being read with stored, input data.

Preferably, the automatic input and storage of the pattern of signals from stationary surroundings around the door takes place at the time of installation. However, this can also be demanded later from service personnel if new objects appear or existing objects are moved or if the reflecting power of stationary objects is changed, for example due to bill-posting, dirt and so forth. Additionally, in the case that the door itself is altered or the sensors sensitivity is varied, new data input can be required. Disturbance from a facing door can also be input and stored.

In addition, continuous inputting and updating can be carried out by calculating the average of a number of previous detections and so forth.

The reference signals are preferably set up to change when the opening angle of the door changes. This depends on, amongst other things, that the sensor is fixed to the door and the direction of the transmitted light pulses will change when the door is opened/closed. The reference signals are also arranged to change depending on the speed and/or the direction of movement of the door.

The light sent out, for example from light-emitting diodes, laser diodes or suchlike, is focused, for example by the transmitter optic system, in such a way that the angular propagaton is small and the light becomes in the main collimated. This results partially in greater intensity in the transmitted light and partially in more precise measurement of the distance of patterned objects, that is objects which have surfaces with varying IR reflection properties. To further increase the intensity of, for example light-emitting diodes, the current of the light-emitting diode is pulsed such that the momentary transmitted effect substantially exceeds the effect of the light-emitting diodes which are subjected to the maximum allowed continuous current.

According to one embodiment of the invention, the transmitter optic system can be of an anamorphic type, that is with the x and y axes having different scales for the reproduction of images. The transmitter optic system can consist of a number of cylindrical lenses with short focal lengths which focus light horizontally, and a reflecting surface in order to focus the light-emitting diodes vertically.

The receiver optic system can consist of an array of lenses, for example Fresnel lenses, where each lens reproduces a small angular area of the total monitored area in a detection device. A position-sensitive detection device is placed in the focus of the lenses. It is possible to deflect the received light beam by means of a reflector device. This enables a flatter design of the sensors. A filter can be arranged in front of the detection device to exclude the visible parts of the light spectrum. The detection device can be angular adjusted in the most appropriate manner to achieve the best reception of light beams.

The receiver optic system can also comprise a diffractive optic system or one or more kino forms where every kino form reproduces images of several different and separate angular areas.

According to a particularly advantageous embodiment of the invention, the sensor is arranged on the door near the lower hinge and with the transmitter and receiver at a distance of approximately 1 dm from each other (forming the base of the triangulation measurement). The transmitter sends light beams at three levels such that at every level, each lens reproduces an image of, for example, 7.5° horizontally.

One or more position-sensitive detection devices are placed in the focus of the receiver optic system in which the light reflected by the object is converted from optical to electrical signals. Alternative embodiments of the silicon-based detectors are for example: photoelectric diodes, photoelectric transistors, multi-element detectors, PSD (Position Sensitive Device) and others.

PSD is a type of photoelectric diode where the current generated by the light is output from two or four sides and where the position of a light spot is determined by measuring the difference between the drawn off currents. This makes possible a very precise determination of the distance to the object.

Light diodes, detectors and electronic devices are assembled onto printed circuit cards.

It is clearly apparent for the skilled-in-the-art that the shown embodiments are merely examples of how an arrangement of the invention can be designed. Other methods of arranging the light sources and the receiver optic system, for example by fixing the light sources to curved surfaces and use of different image-correcting optics, are naturally conceivable within the scope of the invention which is only limited by what is stated in the claims of the patent.

What is claimed is:

1. A method of determining distances and angular positions of stationary and moving objects within an area being monitored in connect ion with a swinging door, the method comprising the following steps:

(a) utilizing a transmitter to transmit substantially collimated light in the area being monitored in different angle sectors in a certain predetermined sequence so that the different angle sectors receive the substantially collimated light at different moments;

(b) utilizing a position-sensitive sensor to detect the substantially collimated light as reflected by a possible object in the area being monitored, the position-sensitive sensor being positioned a certain distance from the transmitter and receiving the substantially collimated light as reflected by a possible object in the area being monitored from the different angle sectors in a corresponding sequence, the substantially collimated light as reflected by a possible object in the area being monitored produces a point of registration on the position-sensitive sensor, the point of registration on the position-sensitive sensor changes when the distance to a possible object in the area being monitored changes;

(c) generating output signals from the position-sensitive sensor which are representative of both distance and angular position of the possible object in the area being monitored; and (d) comparing the output signals from the position-sensitive sensor to stored reference signals.

2. A method according to claim 1, wherein the substantially collimated light is transmitted by means of at least one light source, the different angle sectors are different vertical and horizontal angular sectors, each angular sector is illuminated by the at least one light source and the angular sectors are illuminated sequentially in accordance with the certain predetermined sequence.

3. A method according to claim 2, wherein the predetermined sequence depends on previous detections.

4. A method according to claim 1, wherein the output signals from the position-sensitive sensor correspond to an amount of the substantially collimated light and a position of the substantially collimated light on the position-sensitive sensor and the stored reference signals, to which the output signals are compared, are changed based on at least one parameter of the door.

5. A method according to claim 4, wherein the at least one parameter is selected from a group consisting of an opening angle of the door, speed of the door and direction of movement of the door.

6. A method according to claim 5, wherein the reference signals for different angles of opening are updated automatically and gradually during normal operation of the door.

7. A method according to claim 1, further including the step of generating a signal to a driving device of the door for braking, stopping and changing of direction of the door.

8. A method according to claim 1, further comprising the step of inputting and storing the reference signals.

9. A method according to claim 1, wherein the transmitter has a transmitter optic system of an anamorphic type having x and y axes with different scales for reproduction of images.

10. A method according to claim 1, wherein the position-sensitive sensor has a receiver optic system consisting of an array of lenses where each lens reproduces an image of a small angular area of the area being monitored.

11. A method according to claim 10, wherein the lenses are Fresnel lenses.

12. A method according to claim 1, wherein a receiver optic system is positioned in front of the position-sensitive sensor, the receiver optic system comprising diffractive optics.

13. A method according to claim 12, wherein the receiver optic system comprises at least one kino form, each kino form reproduces images of several different and separate angular areas.

* * * * *

UNITED STATES PATENT AND TRADEMARK OFFICE
CERTIFICATE OF CORRECTION

PATENT NO. : 6,160,479
DATED : December 12, 2000
INVENTOR(S) : Hans Ahlen and Olof Carlsson It is certified that error appears in the above-identified patent and that said Letters Patent is hereby corrected as shown below:

In column 2, line 22, after "sensor", --5-- should be inserted.

In column 2, line 38, after "sensor", --5-- should be inserted.

In column 2, line 39, after "sensor", --5-- should be inserted.

In column 2, line 42, "detector" should be --sensor 5--.

In column 5, line 9 (claim 1, line 3), "connect ion" should be --connection--.

Signed and Sealed this

Twenty-ninth Day of May, 2001

Attest:

NICHOLAS P. GODICI

Attesting Officer

Acting Director of the United States Patent and Trademark Office